US012802493B2

(12) United States Patent
Miyata et al.

(10) Patent No.: US 12,802,493 B2
(45) Date of Patent: Nov. 17, 2026

(54) IMAGE ANALYSIS DEVICE AND METHOD

(71) Applicant: Panasonic Intellectual Property Management Co., Ltd., Osaka (JP)

(72) Inventors: Atsushi Miyata, Osaka (JP); Hidehiko Shin, Osaka (JP); Tomokazu Ichiriki, Kanagawa (JP); Daijiroh Ichimura, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 265 days.

(21) Appl. No.: 18/530,573

(22) Filed: Dec. 6, 2023

(65) Prior Publication Data

US 2024/0112498 A1 Apr. 4, 2024

Related U.S. Application Data

(63) Continuation of application No. PCT/JP2022/012833, filed on Mar. 18, 2022.

(30) Foreign Application Priority Data

Jun. 11, 2021 (JP) ................................ 2021-098078

(51) Int. Cl.
*G06V 40/20* (2022.01)
*G06T 7/20* (2017.01)
(Continued)

(52) U.S. Cl.
CPC ................ *G06V 40/23* (2022.01); *G06T 7/20* (2013.01); *G06T 7/70* (2017.01); *G06V 20/52* (2022.01);
(Continued)

(58) Field of Classification Search
CPC ...... G06V 40/23; G06V 20/52; G06V 40/172; G06V 10/764; G06T 7/20; G06T 7/70;
(Continued)

(56) References Cited

U.S. PATENT DOCUMENTS 10,475,185 B1 * 11/2019 Raghavan ............ G06Q 10/087
2019/0012621 A1 * 1/2019 Kudo ............... G06Q 10/06395
2020/0043174 A1 2/2020 Togashi et al.

FOREIGN PATENT DOCUMENTS

WO 2018/198373 11/2018

OTHER PUBLICATIONS

Multiple Object Tracking, Milan et al 2013 (Year: 2013).*
(Continued)

*Primary Examiner* — Jianxun Yang
(74) *Attorney, Agent, or Firm* — Wenderoth, Lind & Ponack, L.L.P.

(57) ABSTRACT

An image analysis device including: an input interface to acquire image data indicating a captured image of a site in which a plurality of operators performs a plurality of tasks; a controller to generate, based on the image data, task history information indicating the tasks performed in the site by respective operators; and a storage to store the task history information, the controller successively recognizes the tasks and positions of the operators, based on the image data at each time in the site; and detects crossing caused between a plurality of trajectories each including successive positions for each of the operators; generates the task history information associating tasks recognized at each time with the respective operators, based on the trajectories, when the crossing is not detected; and associates the recognized tasks with the respective operators, based on the recognized tasks and past task history information, when the crossing is detected.

11 Claims, 13 Drawing Sheets

(51) Int. Cl.
*G06T 7/70* (2017.01)
*G06V 20/52* (2022.01)

(52) U.S. Cl.
CPC ............... *G06T 2207/30196* (2013.01); *G06T 2207/30232* (2013.01); *G06T 2207/30241* (2013.01)

(58) Field of Classification Search
CPC . G06T 2207/30196; G06T 2207/30232; G06T 2207/30241; G06Q 10/063114
See application file for complete search history.

(56) References Cited

OTHER PUBLICATIONS

International Search Report issued in International Application No. PCT/JP2022/012833 on Jun. 14, 2022.
Extended European Search Report issued Jul. 18, 2024 in corresponding European Patent Application No. 22819880.0.
International Preliminary Report on Patentability issued Dec. 21, 2023 in International Application No. PCT/JP2022/012833.

* cited by examiner

*Fig. 4*

D2

| SECTION | ABNORMAL ORDER |
| --- | --- |
| Z1 | [PACKING, MOVING, PACKING] |
| ⋮ | ⋮ |

*Fig. 9A*

T1

| CANDIDATE | W1 | W2 |
|---|---|---|
| C11 | [PICKING, MOVING, PICKING] | [PACKING, MOVING, PACKING] |
| C12 | [PICKING, MOVING, PACKING] | [PACKING, MOVING, PICKING] |

*Fig. 9B*

T2

| CANDIDATE | W1 | W2 |
|---|---|---|
| C21 | [MOVING, MOVING, BOX PREPARATION] | [PACKING, PACKING, PACKING] |
| C22 | [MOVING, MOVING, PACKING] | [PACKING, PACKING, BOX PREPARATION] |

*Fig. 10*

D4

| OPERATOR | HANDLING QUANTITY | ASSINGED SECTION |
|---|---|---|
| W1 | 29 | Z1 |
| W2 | 31 | Z1 |
| W3 | 23 | Z2 |
| ⋮ | | ⋮ |

*Fig. 13*

T3

| CANDIDATE | W1 | W2 | W3 |
|---|---|---|---|
| C31 | [PICKING, MOVING, PACKING] | [PACKING, MOVING, PICKING] | [MOVING, MOVING, BOX PREPARATION] |
| C32 | [PICKING, MOVING, PACKING] | [PACKING, MOVING, BOX PREPARATION] | [MOVING, MOVING, PICKING] |
| C33 | [PICKING, MOVING, PICKING] | [PACKING, MOVING, PACKING] | [MOVING, MOVING, BOX PREPARATION] |
| C34 | [PICKING, MOVING, PICKING] | [PACKING, MOVING, BOX PREPARATION] | [MOVING, MOVING, PACKING] |
| C35 | [PICKING, MOVING, BOX PREPARATION] | [PACKING, MOVING, PICKING] | [MOVING, MOVING, PACKING] |
| C36 | [PICKING, MOVING, BOX PREPARATION] | [PACKING, MOVING, PACKING] | [MOVING, MOVING, PICKING] |

IMAGE ANALYSIS DEVICE AND METHOD

TECHNICAL FIELD

The present disclosure relates to an image analysis device and method using an image recognition technology.

BACKGROUND ART

Patent Document 1 discloses an image monitoring system identifying a person and to tracking the movement of the person. The image monitoring system detects a person and an abandoned item shown in an image taken by any of a plurality of imaging devices, and identifies a target person who has left the abandoned item. The image monitoring system searches for an image showing the target person from among the images respectively taken by any of the imaging devices, based on a facial feature value and a worn clothing value, such as the color and shape of the clothing, of the target person. The image monitoring system outputs a display showing the movement of the target person on the screen based on the imaging device that has taken each image showing the target person, and the imaging time at which each image was taken.

PATENT DOCUMENTS

Patent Document 1: WO 2018/198373 A

SUMMARY

The present disclosure provides an image analysis device capable of estimating operators performing respective tasks when a plurality of tasks is performed by a plurality of operators.

An image analysis device according to an aspect of the present disclosure includes an input interface, a controller, and a storage. The input interface acquires image data indicating a captured image of a site in which a plurality of operators performs a plurality of tasks. Based on the image data, the controller generates task history information indicating the tasks performed in the site by respective operators among the plurality of operators. The storage stores the task history information. The controller successively recognizes the tasks and positions of the plurality of operators based on the image data at each time in the site. The controller detects crossing caused between a plurality of trajectories, each trajectory including successive positions for each of the plurality of operators. When the crossing is not detected, the controller generates the task history information by associating tasks recognized at each time with the respective operators, based on the plurality of trajectories. When the crossing is detected, the controller associate the recognized tasks with the respective operators, based on the recognized tasks and past task history information.

These general and specific aspects may be implemented by a system, a method, and a computer program, and a combination thereof.

By the image analysis device and method according to the present disclosure, it is possible to estimate operators performing respective tasks when a plurality of tasks are performed by a plurality of operators.

BRIEF DESCRIPTION OF DRAWINGS

FIG. 4 is a view for explaining task order information in the task analysis device;

FIGS. 9A to 9B are views for explaining task combinations used in operator discrimination processing;

FIG. 10 is a view for explaining task plan information in the task analysis device according to a second embodiment;

FIG. 13 is a view for explaining task combinations used in the operator discrimination processing according to the second embodiment.

DETAILED DESCRIPTION

Some embodiments will now be explained in detail with reference to some drawings, as appropriate. However, descriptions more in detail than necessary may be omitted. For example, detailed descriptions of well-known matters and redundant descriptions of substantially the same configurations may also be omitted. This is to avoid unnecessary redundancy in the description below, and to facilitate understanding of those skilled in the art. Note that the inventor(s) provide the accompanying drawings and the following description to facilitate those skilled in the art to fully understand the present disclosure, and the accompanying drawings and the following description are not intended to limit the subject matter defined in the claims in any way.

First Embodiment

1. Configuration

Figure 1:
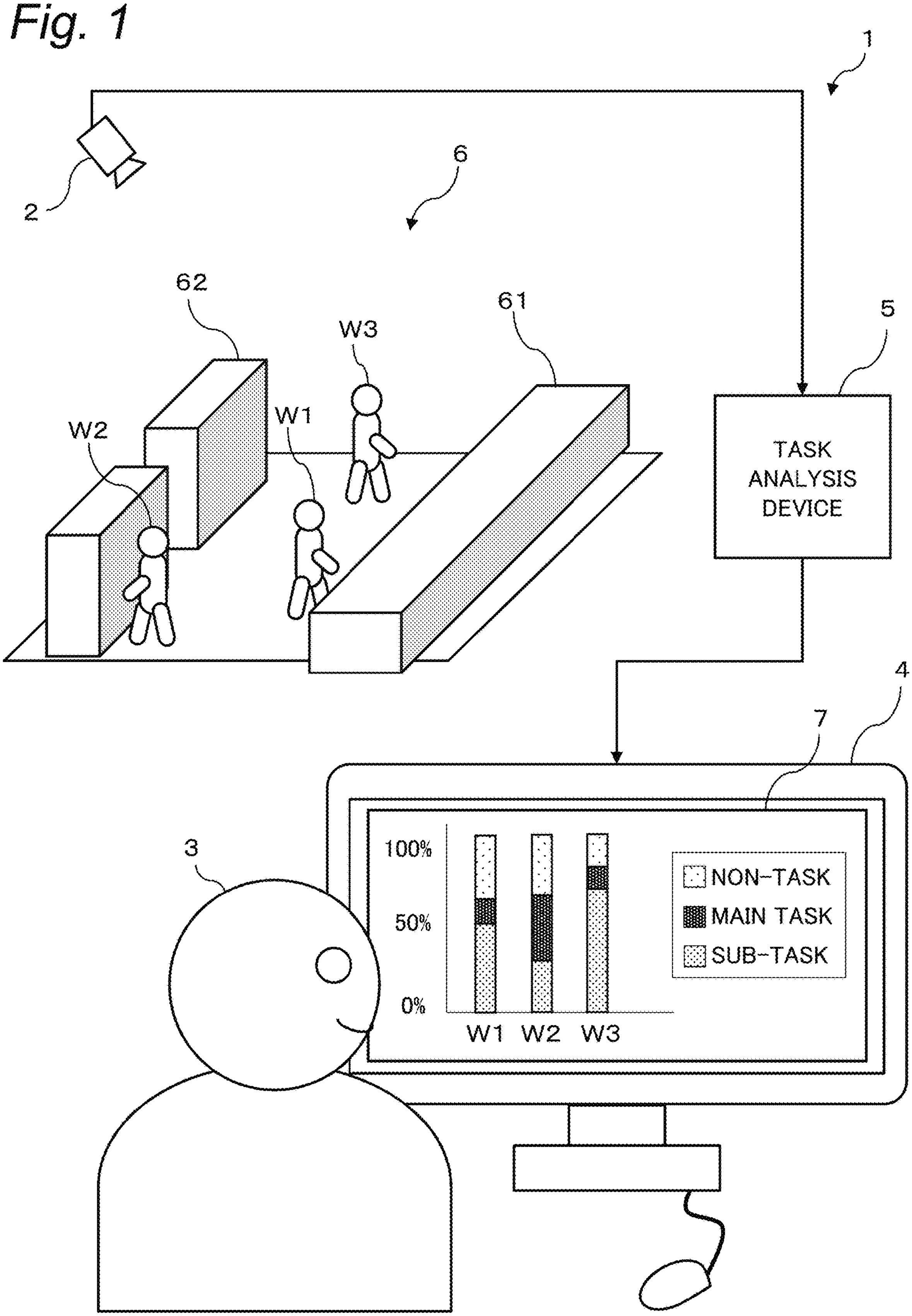
FIG. 1 is a view illustrating an overview of a task analysis system according to a first embodiment.

A task analysis system according to a first embodiment will now be explained with reference to FIG. 1. FIG. 1 is a view illustrating an overview of a task analysis system 1 according to this embodiment.

1-1. System Overview

As illustrated in FIG. 1, the system 1 includes a camera 2 and a task analysis device 5 which is an example of the image analysis device in the present embodiment. The system 1 is used for analyzing the efficiency or the like of operators W1, W2, and W3 who perform a plurality of tasks in a work site 6, such as a logistics warehouse. The work site 6 is an example of the site in the present embodiment. Hereinafter, the operators W1 to W3 are also referred to as operators W. The system 1 may include a monitor 4 for presenting a user 3, such as an administrator or an analyzer in the work site 6, with an analysis chart 7 regarding a predetermined analysis period. The analysis period is a period to be analyzed by image recognition using the camera 2 in the system 1, and is set in advance a period ranging from one day to several months, for example.

In the example illustrated in FIG. 1, a conveyor line 61 and shelves 62 are installed in the work site 6. In this example, the plurality of tasks being performed by the operators W1 to W3 moving across the work site 6 include "picking" that is taking out one or more products from the shelves 62, "packing" that is filling a box with the products, and sending the products onto the conveyor line 61, and "box preparation" that is preparing a box.

The analysis chart 7 in the system 1 presents a ratio of items including "main task", "sub-task", and "non-task" performed by each of the operators W1 to W3 in the analysis period. The items classifies tasks according to a degree of added value by the task, for example. In the example in FIG. 1, the main task is packing, and the sub-task is each of auxiliary tasks such as picking and box preparation related to the main task, and moving toward the conveyor line 61 or the shelves 62, for example. An idling state and the like not related to the main task is classified as non-task. As described above, the task to be analyzed in the task analysis device 5 is not limited to the main task and the sub-task, but also includes the non-task.

By the task analysis system 1 according to the present embodiment, by presenting the analysis chart 7 to the user 3, the user 3 can analyze tasks done by each of the operators W1 to W3, in order to consider improving operating efficiency in the work site 6, for example.

The camera 2 in the system 1 is disposed to capture image of an entire area where the operators W1 to W3 move across the work site 6. The camera 2 repeats an image capturing operation in the work site 6 at a predetermined cycle to generate image data indicating a captured image, for example. The camera 2 is connected to the task analysis device 5 so that the image data is transmitted to the task analysis device 5, for example. Although one camera 2 is illustrated in FIG. 1, the camera 2 included in the system 1 is not limited to one camera, and may be two or more cameras.

The task analysis device 5 includes an information processing device, such as a server. The task analysis device 5 is communicably connected to an external information processing device, such as a personal computer (PC) including a monitor 4. A configuration of the task analysis device 5 will now be explained with reference to FIG. 2.

1-2. Configuration of Task Analysis Device

Figure 2:
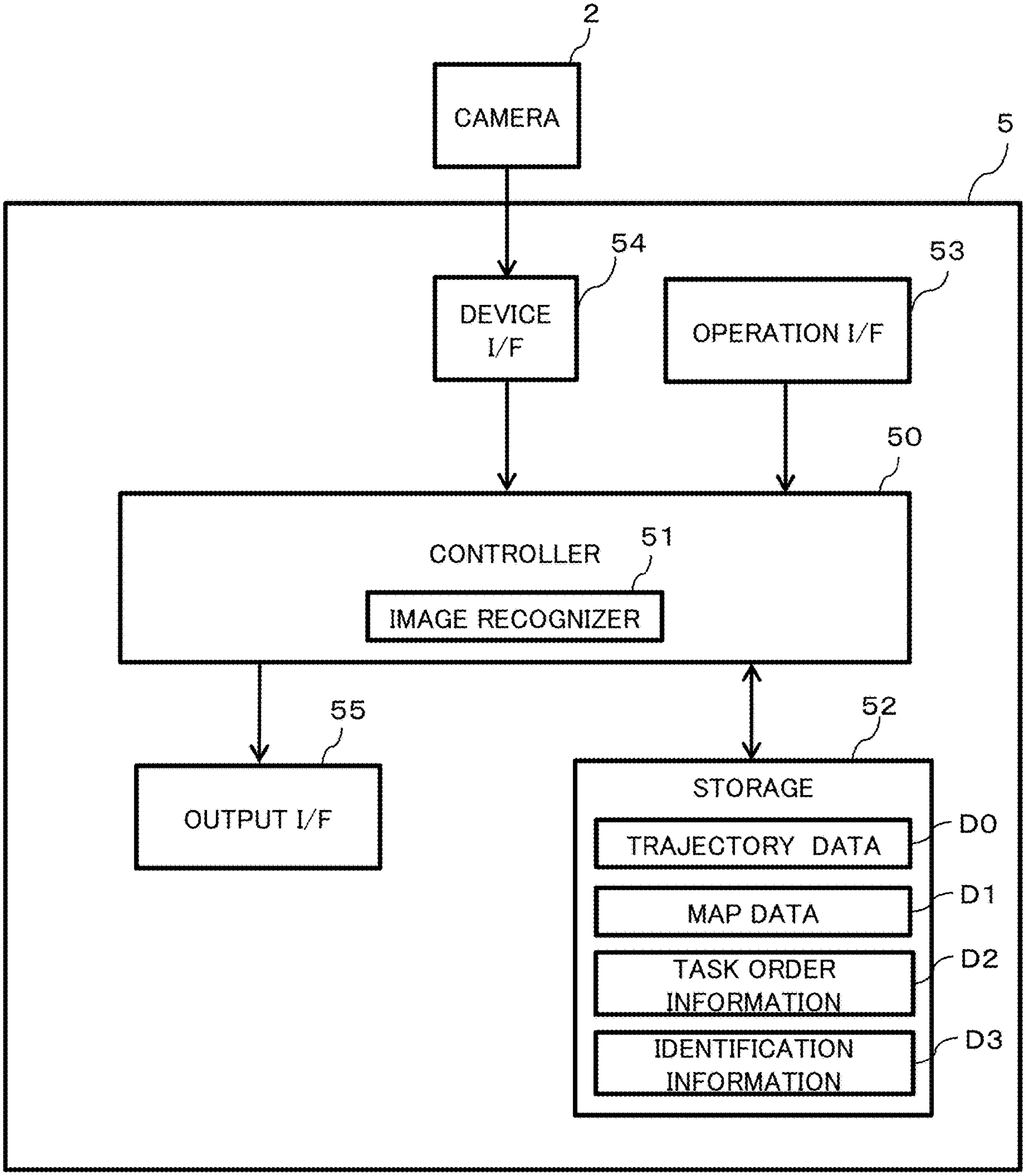
FIG. 2 is a block diagram illustrating a configuration of a task analysis device included in the task analysis system.

FIG. 2 is a block diagram illustrating a configuration of the task analysis device 5. The task analysis device 5 illustrated in FIG. 2 includes a controller 50, a storage 52, an operation interface 53, a device interface 54, and an output interface 55. Hereinafter, the interface is abbreviated as an "I/F".

The controller 50 includes a CPU or an MPU that performs a predetermined function, in cooperation with software, and controls the overall operation of the task analysis device 5, for example. The controller 50 performs various functions by reading data and programs stored in the storage 52 and performing various arithmetic operations. For example, the controller 50 includes an image recognizer 51 as a functional configuration.

The image recognizer 51 applies various image recognition technologies to image data, to recognize a position of a preset processing target in an image indicated by image data, and outputs a recognition result. In the image recognizer 51 according to this embodiment, a person such as the operator W is set as a processing target. The recognition result may include information indicating a time at which the position of the processing target is recognized, for example. The image recognizer 51 performs image recognition processing using a trained model implemented with a neural network model, such as a convolutional neural network. Various types of image recognition algorithms may be used in performing the image recognition processing.

The controller 50 executes a program including a group of commands for performing the function of the task analysis device 5, for example. Such a program may be provided over a communication network such as the Internet, or stored in a portable recording medium. The controller 50 may also include an internal memory, as a temporary storage area, where various types of data and programs are retained.

The controller 50 may be a hardware circuit such as a dedicated electronic circuit designed to perform a predetermined function, or a reconfigurable electronic circuit. The controller 50 may include various semiconductor integrated circuits such as a CPU, an MPU, a GPU, a GPGPU, a TPU, a microcomputer, a DSP, an FPGA, and an ASIC.

The storage 52 is a storage medium that stores programs and data required for performing the function of the task analysis device 5. The storage 52 includes a hard disk drive (HDD) or a semiconductor storage device (SSD), for example. For example, the storage 52 stores the program described above, and various types of information such as trajectory data D0, map data D1, task order information D2, and identification information D3.

The trajectory data D0 indicates trajectories of the operators W each moving across the work site 6. The trajectory data D0 is generated based on the recognition result obtained by inputting image data acquired from the camera 2 to the image recognizer 51, for example. The map data D1 indicates a layout of various facilities such as the conveyor line 61 and the shelves 62 in the work site 6, with respect to a predetermined coordinate system. The task order information D2 is information indicating the temporal order in which tasks in a combination are performed. The identification information D3 is information identifying an individual, such as each of the operators W1 to W3. Each piece of these information will be described later in detail.

The storage 52 may include a temporary storage element including a DRAM or an SRAM, and may function as a working area of the controller 50, for example. For example, the storage 52 may temporarily store data such as the image data received from the camera 2 and the recognition result output from the image recognizer 51.

The operation interface 53 is a general term indicating operation members that receive user operations. The operation interface 53 includes any one of a keyboard, a mouse, a trackpad, a touchpad, a button, and a switch, or a combination thereof, for example. The operation interface 53 acquires various types of information input via a user operation.

The device I/F 54 is a circuit via which an external device such as the camera 2 is connected to the task analysis device 5. The device I/F 54 communicates with the external device, in accordance with a predetermined communication standard. Examples of the predetermined standard include USB, HDMI (registered trademark), IEEE 1395, IEEE 802.11, and Bluetooth (registered trademark). The device I/F 54 is an example of an input interface that receives various types of information from the external device, in the task analysis device 5. In the task analysis system 1, the task analysis device 5 acquires image data indicating moving image captured by the camera 2 via the device I/F 54, for example.

The output I/F 55 is a circuit for outputting information. The output I/F 55 outputs signals such as video signals to an external display device such as a monitor and a projector for displaying various types of information, in compliance with the HDMI standard, for example.

The configuration of the task analysis device 5 described above is merely exemplary, and the configuration of the task analysis device 5 is not limited thereto. The task analysis device 5 may be configured using various types of computers, including a personal computer (PC). In addition to or instead of the output I/F 55, the task analysis device 5 may include a display implemented with a liquid crystal display or an organic EL display as a built-in display device, for example. In addition, the task analysis method according to the embodiment may be executed in distributed computing.

In addition to or instead of the above configuration, the task analysis device 5 may have a configuration that communicates with an external information processing device over a communication network. For example, the operation interface 53 may be configured to receive an operation performed by an external information processing apparatus that is connected over a communication network. Furthermore, the output I/F 55 may transmit various types of information to an external information processing apparatus over a communication network.

In addition, the input interface in the task analysis device 5 may be implemented by cooperating with various kinds of software in the controller 50, for example. The input interface in the task analysis device 5 may acquire various types of information by reading the various types of information stored in various storage media (e.g., the storage 52) onto the working area of the controller 50.

1-3. Various Data Structures

As described above, the task analysis device 5 according to the present embodiment stores the trajectory data D0, the map data D1, the task order information D2, and the identification information D3 in the storage 52. An example of structures various data D0 to D3 and the like will now be explained.

The trajectory data D0 manages, time, a trajectory ID identifying a trajectory of an operator W, and the position of the operator W recognized by the image recognizer 51 in the work site 6 at the respective times, associating them with each other, for example. The trajectory data D0 maps a trajectory based on the positions of the operator W at each time, to the map data D1, for example.

Figure 3:
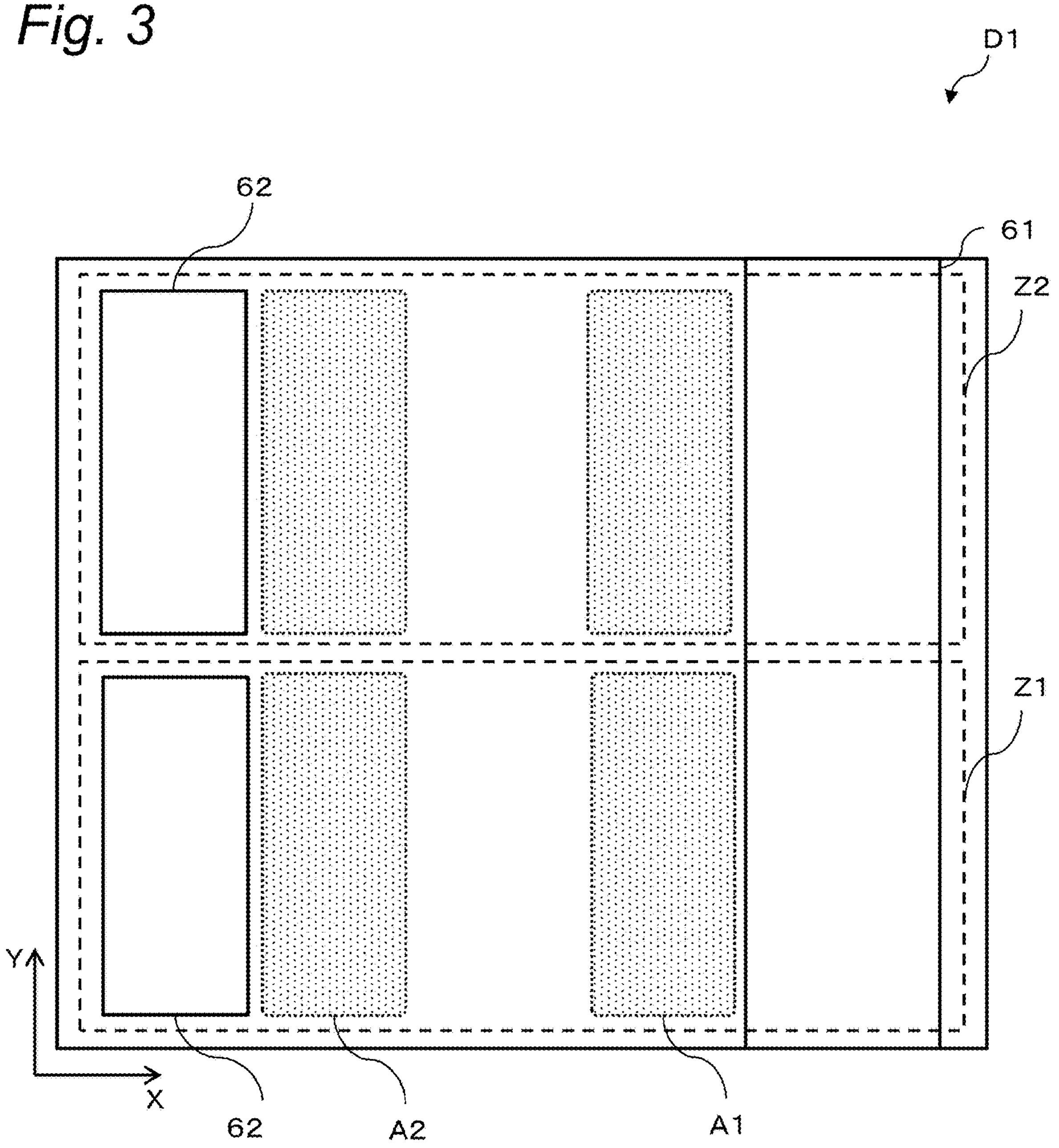
FIG. 3 is a view for explaining map data in the task analysis device.

FIG. 3 is a view for explaining the map data D1. The map data D1 manages an arrangement of sections and task areas, which are described later, associating with data indicating a coordinate system of a map, such as a layout of various facilities in the work site 6 viewed from above. Hereinafter, two directions that are orthogonal to each other on a horizontal plane in the work site 6 are referred to as an X direction and a Y direction, respectively. The position in the work site 6 is defined by an X coordinate indicating a position in the X direction and a Y coordinate indicating a position in the Y direction, for example.

In the map data D1 illustrated in FIG. 3, the conveyor line 61 and the shelves 62 are positioned with a space in the X direction, reflecting the work site 6 illustrated in FIG. 1. In the example illustrated in FIG. 3, the conveyor line 61 extends in the Y direction, and conveys boxes in a direction from positive to negative in the Y direction. The map data D1 in this example manages the work site 6 by dividing the work site 6 into a plurality of sections in the Y direction. FIG. 3 illustrates an example in which the work site 6 is divided into a section Z1 and a section Z2. Each of the sections Z1, Z2 is set in advance, as a unit section in which the operator W performs the main task in the work site 6, for example.

Each of the sections Z1, Z2 includes a task area indicating an area in which the operator W operates in the work site 6. The section Z1 in FIG. 3 includes a task area A1 near the conveyor line 61, and a task area A2 near the shelves 62. Each of the task areas A1, A2 is set in advance, as an area indicating a range of positions where one or more tasks associated with the conveyor line 61 or the shelves 62 are expected to be performed in the work site 6.

In addition, the task analysis device 5 according to the present embodiment stores, in the storage 52, task area information associating the positions in the work site 6 with the tasks. The task area information manages, for each of the sections included in the work site 6, associating the task areas with tasks performed in the respective task areas, for example. For example, packing and box preparation are performed in the task area A1 near the conveyor line 61 in the section Z1, and picking is performed in the task area A2 near the shelves 62 in the section Z1. The task area information may also include, for the area A1 to which a plurality of tasks are associated, information indicating a positional relationship among the plurality of tasks in the Y direction.

FIG. 4 is a table for explaining the task order information D2 in the task analysis device 5 according to the present embodiment.

The task order information D2 manages, as illustrated in FIG. 4, the "section" in the work site 6 and an "abnormal order" associating with each other. The abnormal order indicates an order considered to be abnormal as an order in which one operator W performs the tasks, for example. In the example illustrated in FIG. 4, the section Z1 is associated with an abnormal order "packing, moving, packing" in temporal order. For example, in the section Z1, the abnormal order is set in advance, assuming that an order such that an operator W after packing and moving starts packing again without holding package is abnormal. The abnormal order is an example of a predetermined order in the present embodiment.

Although not illustrated, the task analysis device 5 according to the present embodiment stores, in the storage 52, task tendency information regarding the work site 6, in addition to the task order information D2, for example. The task tendency information includes information such as a standard task period set for each task performed by each of the operators W1 to W3, for example. The task tendency information may include information indicating various tendencies in which various tasks are performed by the operators W to be analyzed in the work site 6. In addition, the task tendency information may include information indicating the classifications, such as the main task and the sub-task used in the analysis chart 7.

Furthermore, the task analysis device 5 according to the present embodiment stores, in the storage 52, identification information D3 identifying individuals, such as the operators W1 to W3. The identification information D3 is acquired in advance using a card reader or the like installed in the work site 6, through an identification operation performed by each of the operators W1 to W3, upon entry to the work site 6, and is transmitted to the task analysis device 5, for example. The identification information D3 includes information indicating a time at which the identification operation is received from each of the operators W1 to W3, for example. An operation of the task analysis device 5 using these various types of information will be described later.

2. Operation

An operation of the task analysis system 1 and the task analysis device 5 having the configuration described above will now be explained.

The task analysis system 1 illustrated in FIG. 1 recognizes the positions of the operator W at each time (i.e., the trajectory) in the work site 6, through the image recognition processing, and recognizes a performed task that is a task performed by the operator in the respective position at each time. The system 1 accumulates information indicating the recognition result of the performed task, and generates the analysis chart 7 visualizing the performed tasks for each of the operators W1 to W3 in the analysis period, based on the accumulated information.

The task analysis device 5 according to the present embodiment associates a trajectory ID with each of the operators W1 to W3, based on a time at which a position of the trajectory ID in the work site 6 is first recognized in the trajectory data D0, and the identification information D3 including a time at which each of the operators W1 to W3 enters the work site 6, for example. The task analysis device 5 then recognizes the positions of the operators W and the performed tasks, by applying image recognition using the image recognizer 51 to an image of the work site 6 captured by the camera 2 for example. The task analysis device 5 then updates the trajectory data D0 by associating the recognized positions to past positions of the operators W1 to W3, respectively. In this manner, the task analysis device 5 discriminates the operators W1 to W3 who performed the respective performed task at the respective recognized positions.

In such a processing, the performed tasks at each time can be recognized by applying image recognition processing to the captured image from the camera 2. However, identifying the trajectory or the operator W corresponding to the respective performed tasks may be challenging, when the trajectories cause crossing such that a plurality of trajectories cross each other. To overcome this challenge, in the present embodiment, the task analysis system 1 provides the task analysis device 5 capable of estimating the operator W who performs the recognized respective performed tasks, even when the crossing as described above occurs.

2-1. Problem

A scene that may obstruct identifying the operator performing the respective performed tasks, in the task analysis system 1 according to the present embodiment, will now be explained with reference to FIGS. 5A to 5C and 6A to 6C.

Figure 5A:
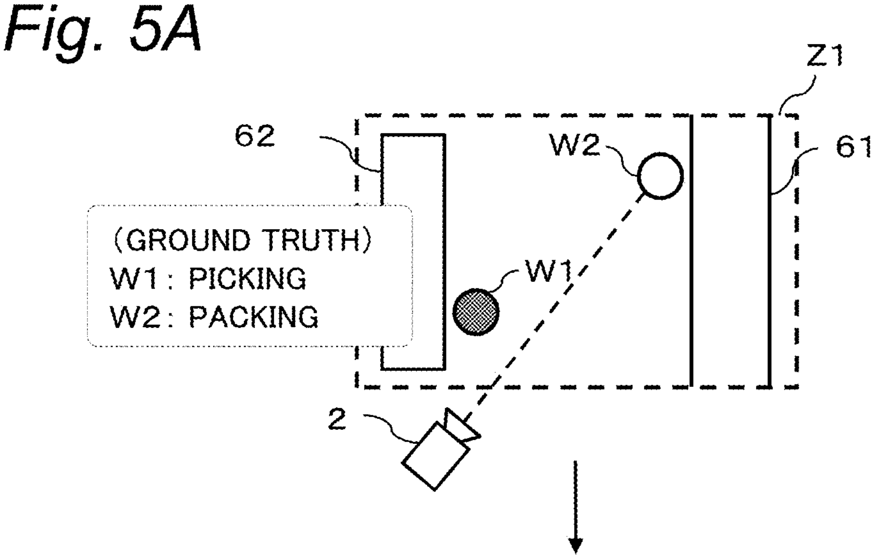
FIGS. 5A to 5C are views illustrating a first example for explaining a problem related to the task analysis device.
Figure 5B:
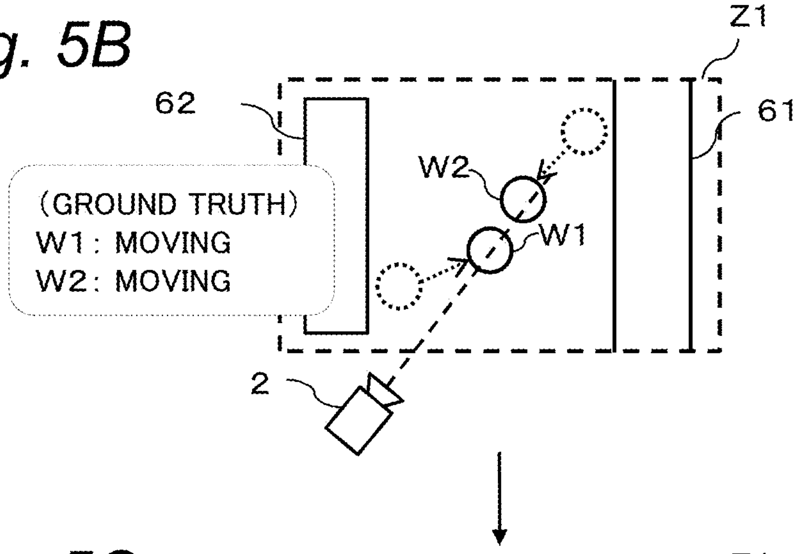
Figure 5C:
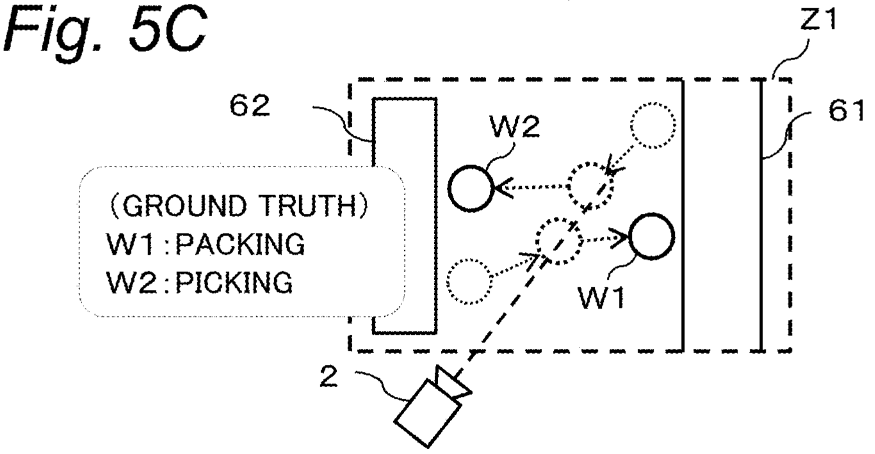
Figure 6A:
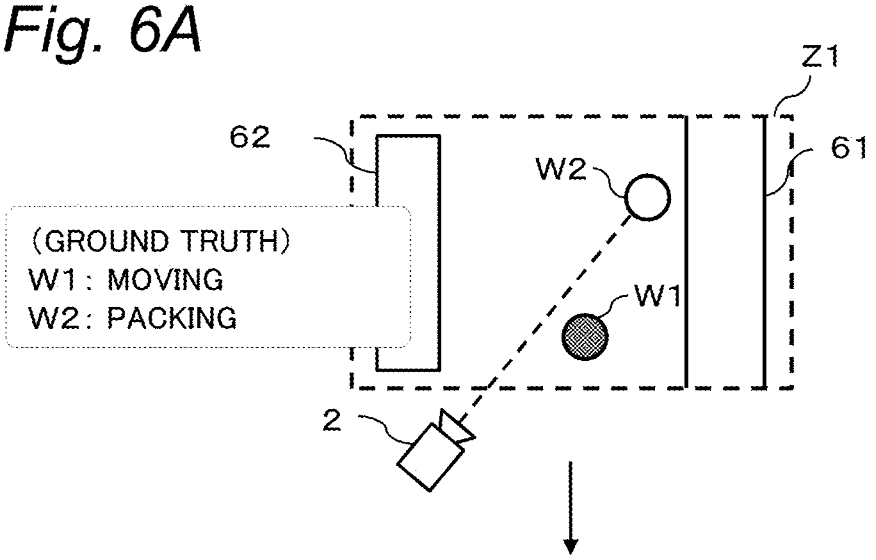
FIGS. 6A to 6C are views illustrating a second example for explaining the problem related to the task analysis device.
Figure 6B:
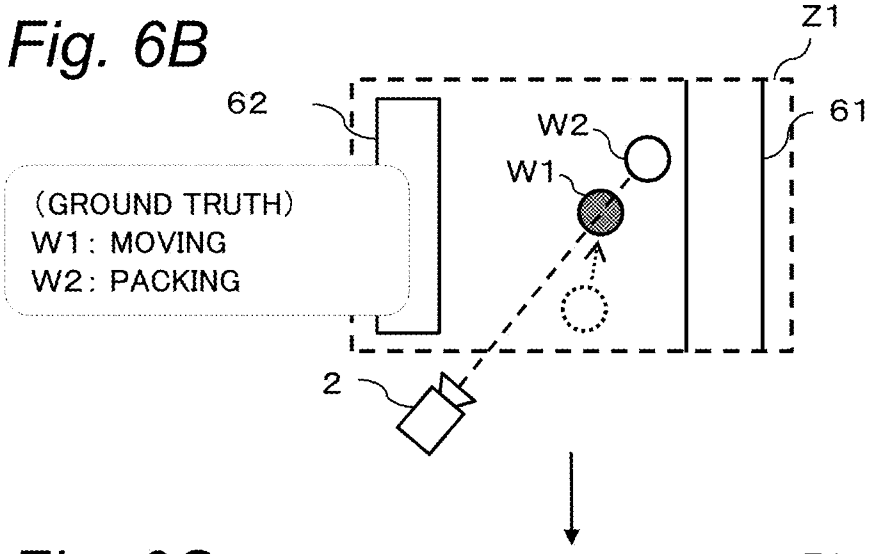
Figure 6C:
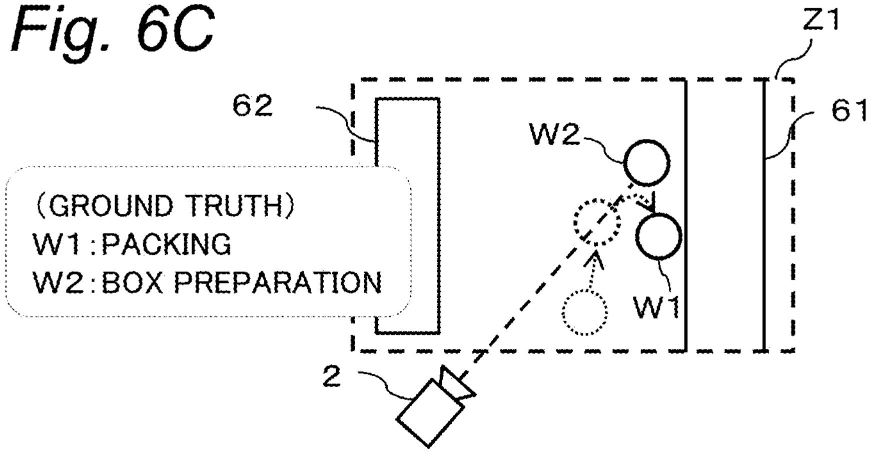

FIGS. 5A to 5C are views illustrating a first example for explaining a problem related to the task analysis device 5. FIGS. 6A to 6C are views illustrating a second example for explaining the problem related to the task analysis device 5. FIGS. 5A to 5C and 6A to 6C are views of operators W in a work site 6 viewed from above, and illustrate an operator W1 and an operator W2 both operating in the section Z1.

FIG. 5A illustrates a scene in which the operator W1 is performing “picking” and the operator W2 is performing “packing”. FIG. 5B illustrates a scene in which the operator W1 and the operator W2 are “moving”, from the scene illustrated in FIG. 5A. FIG. 5C illustrates a scene in which the operator W1 who moved from the scene in FIG. 5B is performing “packing”, and the operator W2 is performing “picking”.

In the examples illustrated in FIGS. 5A to 5C, positions of the operators W are recognized based on the captured image by the camera 2, using image recognition, and the performed tasks at the respective positions are recognized in accordance with the task areas A1, A2 in FIG. 3 and the like. In the scene illustrated in FIG. 5B, occlusion occurs in which the operator W2 is not shown in the captured image, resulting from the operator W2 being behind the operator W1 in the direction of the line of sight of the camera 2. In such a case, once the trajectories of the operators W1, W2 become the crossing state, even when the performed tasks at the two respective positions can be recognized thereafter in the example illustrated in FIG. 5C, it is difficult to determine to which position each of the operators W1, W2 moved to perform a corresponding performed task, based on image recognition or the like of each of such positions.

FIG. 6A illustrates a scene in which the operator W1 is “moving” and the operator W2 is “packing”. FIG. 6B illustrates a scene in which the operator W1 is “moving” from the scene illustrated in FIG. 6A, and the operator W2 is still “packing”. FIG. 6C illustrates a scene in which the operator W1 who moved from the scene illustrated in FIG. 6B is performing “packing”, and the operator W2 shifts to the “box preparation”.

In the examples illustrated in FIGS. 6A to 6C, occlusion occurs in the scene illustrated in FIG. 6B, similarly to the scene in FIG. 5B, resulted from moving of the operator W1. In this case, too, once the trajectories of the operators W1, W2 become the crossing state, even when the performed tasks at the two respective positions can be recognized after in the example illustrated in FIG. 6C, it is difficult to determine to which position the operator W1 moved to perform a corresponding performed task, based on image recognition or the like of each of such positions.

As described above, even though the positions of the operators W and performed tasks in the work site 6 can be recognized at each time, when the trajectories of the operators W become the crossing state, it is sometimes difficult to distinguish the operators W performing the respective performed tasks. In particular, when the trajectories of operators W1 to W3 become the crossing state in a situation such that the operators W1 to W3 wears uniform with the same color and the shape in the work site 6, it is difficult to distinguish the operators W1 to W3 of the respective performed tasks based on the image recognition or the like, for example.

To overcome this problem, the task analysis device 5 according to the present embodiment performs processing to estimate the operator performing each task, using the task tendency information such as the task order information D2, in addition to the positions of performed task determined based on the captured image. By such processing, even in a situation where trajectories of a plurality of operators become the crossing state and it is difficult to determine the operators W by applying image recognition or the like of their positions, as illustrated in FIGS. 5C and 6C, it is possible to determine the operators W of the respective performed tasks.

For example, in the situation illustrated in FIG. 5C, the operator W2 who performed packing should not perform packing again after moving, based on the abnormal order “packing, moving, packing” in the task order information D2, therefore it is possible to estimate that the performed task by the operator W2 is picking. In other words, it is possible to estimate that the operator W2 performs picking, and the operator W1 performs packing. Furthermore, in the situation illustrated in FIG. 6C, by using the information on a period passed from a time at which the operator W2 started packing, it is possible to estimate that the operator W1 performs packing, and the operator W2 performs box preparation.

2-2. Overall Operation

The overall operation of the task analysis device 5 in the task analysis system 1 will now be explained with reference to FIG. 7.

Figure 7:
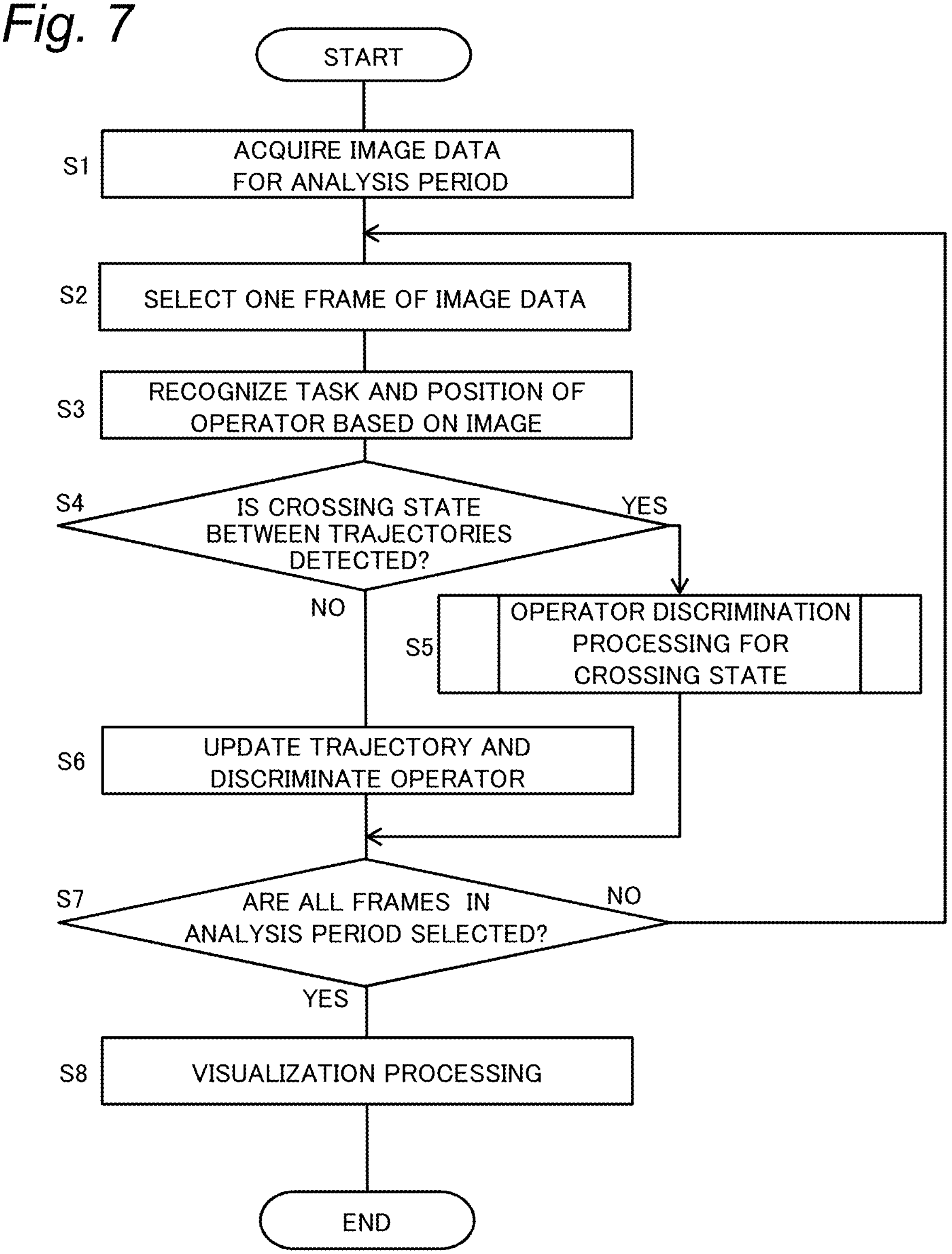
FIG. 7 is a flowchart for explaining the overall operation of the task analysis device.

FIG. 7 is a flowchart for explaining the overall operation of the task analysis device 5. The processing indicated in this flowchart is performed by the controller 50 in the task analysis device 5, for example.

To begin with, the controller 50 acquires the image data corresponding to the analysis period from the camera 2 via the device IF 54, for example (S1). While the operators W1 to W3 operate in the work site 6, the camera 2 captures moving image to generate image data indicating the captured image at each time at a predetermined cycle such as a frame cycle of the moving image, and records the image data in the internal memory, for example. The camera 2 transmits the image data recorded over the analysis period, to the task analysis device 5. The controller 50 stores the acquired image data in the storage 52, for example.

The controller 50 then selects, in the temporal order, the image data corresponding to one frame indicating an image captured at each time from the acquired image data in the analysis period, for example (S2). The controller 50 then records the time at which the selected one frame is captured, as a time in the trajectory data D0, for example.

The controller 50 functioning as the image recognizer 51 recognizes the positions of the operators W and tasks in the image indicated by the image data of the selected one frame (S3). In step S3, the controller 50 transforms the positions recognized in the image into positions in a coordinate system indicating the positions of the work site 6, based on the map data D1, for example. The controller 50 also recognizes the tasks using the task area information based on that the recognized position is located in the task area A1, the task area A2, or another area, for example.

In the example illustrated in FIG. 6C, two operators W are recognized at positions within the task area A1 associated with two tasks, that is, packing and box preparation. In such a case, based on a relation that the box preparation is performed on the upstream side of the conveyor line 61 (+Y direction in FIG. 3), the controller 50 recognizes the performed tasks at the respective positions of the operators W, for example.

Based on the recognition result in step S3, the controller 50 detects the crossing state of trajectories, for example (S4). For example, the controller 50 detects whether any occlusion occurs, resultant of the positions of a plurality of operators W overlapping with each other, in the captured image corresponding to the selected frame. For example, when it is determined that occlusion occurs, and that the positions recognized in the work site 6 are within a predetermined range from the latest positions of the trajectories in the trajectory data D0, the controller 50 determines that the trajectories become the crossing state. The predetermined range is set in advance as a range small enough to be considered as a range in which the operator W moves within a time interval corresponding to a frame cycle in the work site 6, for example.

When no the crossing state is detected (NO in S4), the controller 50 updates the trajectory data D0 by adding the positions recognized in step S3 for this cycle, as the positions of the corresponding trajectory IDs (S6). In this step, the controller 50 determines which one of the operators W1 to W3 corresponds to the performed task at each of the positions recognized in step S3, by associating the respective performed task with each of the positions and the corresponding trajectory ID in the trajectory data D0 (S6). The information associating a performed task and an operator W with each position in the trajectory data D0 is an example of the task history information according to the present embodiment.

By contrast, when the crossing state is detected (YES in S4), the controller 50 according to the present embodiment determines the operator W corresponding to each of the recognized tasks, based on tasks recognized in the crossing state, and the past performed task by each of the operators associated with the trajectory data D0 (S5). By performing operator discrimination processing for the crossing state (S5), it is possible to estimate the operators W even in trajectory the crossing state where the operators W performing the tasks cannot be identified by associating the positions recognized in step S3 with the past trajectories. The controller 50 according to the present embodiment refers to the task tendency information, such as the task order information D2, to perform the operator discrimination processing the crossing state (S5). The operator discrimination processing for the crossing state (S5) will be described later in detail. Hereinafter, the operator discrimination processing for the crossing state will also be simply referred to as operator discrimination processing.

After determining the operator W corresponding to each of the performed tasks (S5, S6), the controller 50 proceeds to step S7. When all the frames in the image data in the analysis period are not selected yet (NO in S7), the controller 50 performs the processing from steps S2 to S6 again, on the image data of the next time. In this manner, the trajectory data D0 based on the image data in each time in the analysis period, is obtained. The processing in steps S3 to S6 may be executed for each of the sections in the work site 6, examples of which is illustrated in FIG. 2, and the processing may proceed to step S7 once after steps S3 to S6 are performed for all of the sections per frame.

When all of the frames in the analysis period are selected (YES in S7), the controller 50 performs visualization processing to generate the analysis chart 7 (S8). For example, the controller 50 counts the number of times a task is determined per time interval, such as for each period corresponding one frame, for each of the operators W1 to W3 in the work site 6. Upon obtaining the total number of times by which each task is performed during the analysis period for each of the operators, the controller 50 calculates the ratio of each task performed by the specific operator to generate the analysis chart 7. The analysis chart 7 indicates the ratio of each task, as a ratio of the time for which the task is performed, with respect to the analysis period, for example.

For example, the controller 50 stores the analysis chart 7 generated in the visualization processing (S8) in the storage 52, and ends the processing illustrated in this flowchart.

With the processing described above, the positions of the operators W and the tasks in the work site 6 are recognized based on the image data (S3), and the operators W performing the respective tasks at the respective positions are identified by associating the recognized positions with the past trajectories in the trajectory data D0 (S6). In the crossing state of trajectories (YES in S4), operators are discriminated by the operator discrimination processing (S5). Therefore, information in which each of the performed tasks is assigned with an operator included in the trajectory data D0 is obtained, and the analysis chart 7 is generated based on the performed tasks performed by each of the operators, across the entire time intervals in the analysis period (S8).

In step S1 described above, image data generated by the camera 2 may be acquired sequentially. For example, instead of step S7, the controller 50 may repeat the processes in step S1 and subsequent steps until the trajectory data D0 is obtained based on the image data for the number of frames in the analysis period. Furthermore, in detection of the crossing state of trajectories (S4), the controller 50 may detect the crossing state based on any one of occlusion in the captured image and the positions of the operators W in the work site 6, for example.

2-3. Operator Discrimination Processing

Details of the operator discrimination processing in step S5 illustrated in FIG. 7 will now be explained with reference to FIGS. 8, 9A and 9B.

Figure 8:
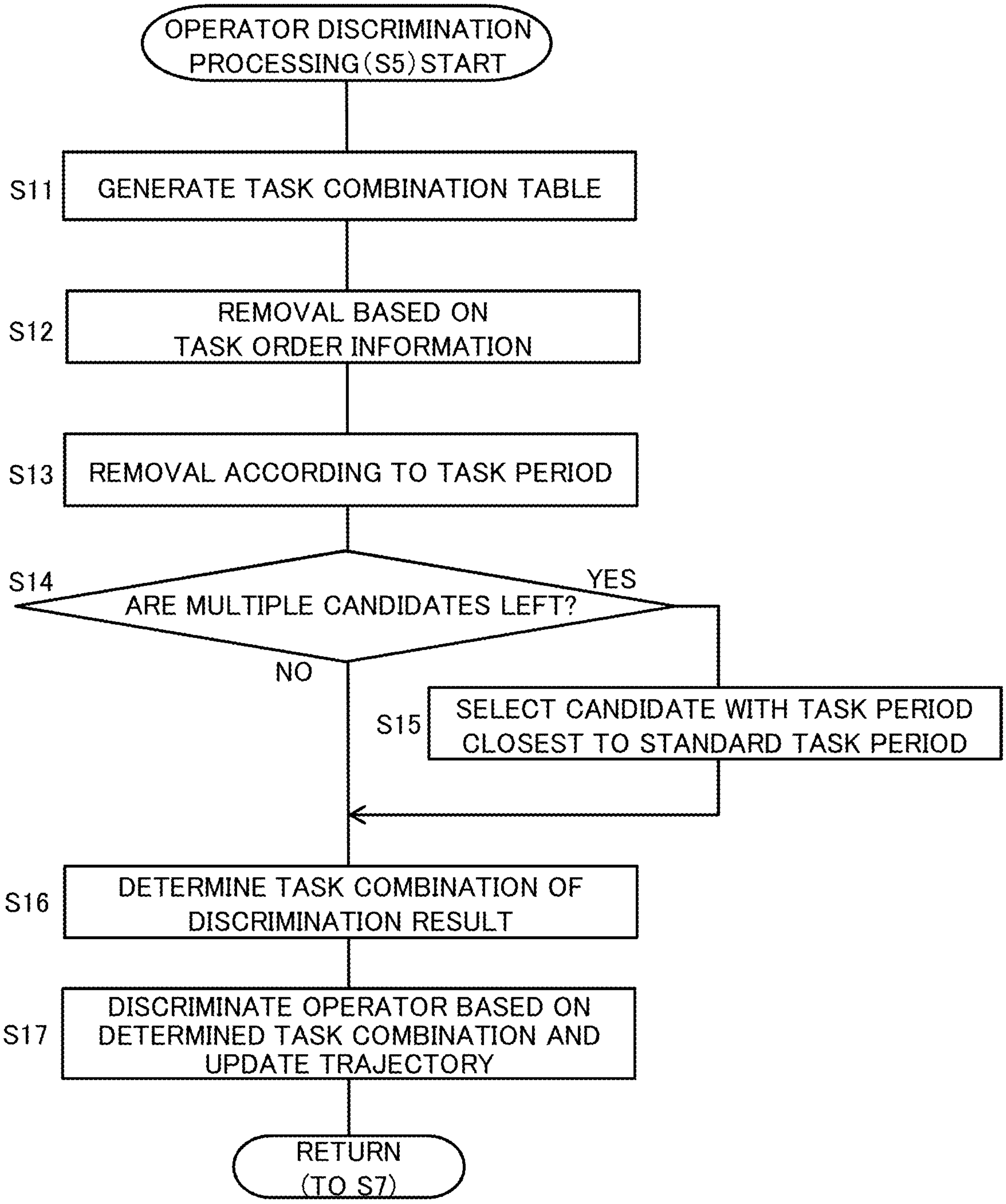
FIG. 8 is a flowchart illustrating operator discrimination processing executed by the task analysis device according to the first embodiment.

FIG. 8 is a flowchart illustrating the operator discrimination processing (S5 in FIG. 7) in the task analysis device 5 according to the present embodiment. FIGS. 9A and 9B are views for explaining task combinations used in the operator discrimination processing. FIGS. 9A and 9B illustrate task combination tables T1, T2 for the scenes illustrated in FIGS. 5A to 5C and FIGS. 6A to 6C, respectively. The task combination tables T1, T2 store a plurality of candidates of task combinations that are combinations of a plurality of operators W and a plurality of tasks. Each candidate indicates a task combination that associates each operator with a task sequence including two or more tasks. A task sequence is a set of tasks of the past performed tasks by each operator and the performed task for which the operator is to be identified, arranged in the order in which the tasks are recognized.

In the operator discrimination processing (S5) according to the present embodiment, the controller 50 determines, referring to the task tendency information such as the task order information D2, one candidate from the plurality of candidates in the task combination tables T1, T2, as a task combination of the discrimination result. Based on the determined task combination, the controller 50 discriminates the operators W for each of the tasks.

In the flowchart illustrated in FIG. 8, to begin with, the controller 50 generates the task combination tables T1, T2 by calculating task combination of the tasks recognized subsequently to the time at which the crossing state is detected, and the operators W associated with the past tasks (S11). The controller 50 generates a task combination including at least two tasks, by referring to the past tasks and the operators W associated with the trajectory data D0, for example.

In the example illustrated in FIGS. 5A to 5C, the trajectories of the operators W1, W2 become the crossing state in the scene illustrated in FIG. 5B. At this time, the tasks performed by the two operators W are both recognized as "moving" (S3 in FIG. 7). Therefore, it is possible to associate the operators W1, W2 with the same task, without performing any particular discrimination. In such a case, in step S11, the controller 50 selects a frame of the next time and recognizes the positions of the operators W and the tasks, based on the image data of the frame, as in step S3 in FIG. 7, for example. As a result, the frame corresponding to the scene illustrated in FIG. 5C is selected, and the positions of the operators W and the tasks "packing" and "picking" are recognized at the respective positions.

Furthermore, in the example illustrated in FIGS. 5A to 5C, the controller 50 generates the task combination table T1 illustrated in FIG. 9A, based on the operators W1, W2 related to the crossing state and the tasks recognized in the frames for the scenes illustrated in FIGS. 5(A) to (C). For example, in detecting the crossing state (S4 in FIG. 7), the controller 50 determines the operators W1, W2 relevant to the crossing state, that is, operators associated with the plurality of trajectories in the crossing state, based on the positions recognized in step S3 and the past positions of the operators W in the trajectory data D0. With respect to the two operators W1, W2, the controller 50 generates, as candidates, task combinations for the number of patterns that can be obtained by switching tasks recognized at the time illustrated in FIG. 5C, the tasks being unable to be associated with the operators based on the trajectories (S11).

The task combination table T1 in FIG. 9A stores candidates C11, C12 both including past tasks "picking, moving" for the operator W1 and "packing, moving" for the operator W2, and also including each of "picking" and "packing", for each of the operators, the "picking" and "packing" being tasks which cannot be associated with the operators W based on the trajectories.

In the example illustrated in FIGS. 6A to 6C, it is assumed that the crossing state is detected in the frame corresponding to the scene illustrated in FIG. 6C (YES in S4 illustrated in FIG. 7). At this time, it is difficult to associate the tasks recognized in step S3 with the operators W1, W2, based on their trajectories, as in step S6. Therefore, in this case, the controller 50 generates the task combination table T2 illustrated in FIG. 9B, based on the tasks recognized when the crossing state is detected, and the past tasks associated with the scenes illustrated in FIGS. 6A and 6B (S11).

The task combination table T2 illustrated in FIG. 9B stores candidates C21, C22 both including past tasks "moving, moving" for the operator W1, and "packing, packing" for the operator W2, respectively, and each including one of "box preparation" and "packing", which are unable to be associated with the operators W based on the trajectories, for each of the operators.

The controller 50 then removes candidates from the task combination tables T1, T2 based on the task order information D2 (S12). For example, the controller 50 determines whether each one of the candidates corresponds to any one of the abnormal orders in the task order information D2, and removes the corresponding candidate from the task combination tables T1, T2.

For example, in the task combination table T1 illustrated in FIG. 9A, the task combinations in the candidate C11 for the operator W2 matches the abnormal order in the task order information D2 illustrated in FIG. 4. Therefore, the candidate C11 is removed from the task combination table T1 (S12).

The controller 50 then removes a candidate for which the task period of the performed task exceeds a standard task period, from the task combination tables T1, T2, based on information of the standard task period stored in the storage 52, for example (S13). For example, the controller 50 calculates the task period of the latest performed task in the task sequence of each candidate, and removes the candidate including the task sequence in which the task period exceeds a predetermined period indicating a significant excess from the standard task period. The standard task period is calculated in advance, as a period required for the respective operators to perform each of the tasks, by averaging periods measured a plurality of number of times. An increment of the predetermined period is set as three times the standard deviation of the measured periods, for example.

For example, in the task combination table T2 illustrated in FIG. 9B, when packing continues from the scene illustrated in FIG. 6A for a task period longer than the predetermined period, the candidate C21 for the operator W2 is removed from the task combination table T2. The packing is an example of a first task in the present embodiment.

For example, after removing the candidates as described above (S12, S13), the controller 50 determines whether there are a plurality of candidates not removed, that is, whether the plurality of candidates are left in the task combination tables T1, T2 (S14). In a case where all of the candidates are removed in steps S12 and S13, in order to leave at least one candidate for step S14, the controller 50 may relax the condition for removing by the task tendency information, and perform the processing in step S11 and subsequent steps again, for example. For example, the predetermined period used in removing the candidate by the task period (S13) may be set to be longer than that used in the above example.

When the plurality of candidates are not left in the task combination tables T1, T2 (NO in S14), the controller 50 determines remaining one of the candidates as the task combination corresponding to the discrimination result (S16). In the task combination tables T1, T2 illustrated in FIGS. 9A and B, the candidates C12, C22 left without being removed are determined as the task combinations of the discrimination result.

By contrast, when a plurality of candidates are left (YES in S14), the controller 50 selects a candidate including a task sequence in which the latest performed task with a period having the smallest difference from the standard task period, among the plurality of candidates, for example (S15). The controller 50 determines the selected candidate as the task combination of the discrimination result (S16).

From the task combination corresponding to the discrimination result, the controller 50 discriminates operators W of the respective tasks recognized at the latest time, the respective tasks being unable to be associated with the operators W for based on the trajectories (S17). The controller 50 then updates the trajectory data D0 by adding the determined positions of the respective operators W at the latest time, each as the position of the corresponding trajectory ID (S17).

In the example illustrated in FIG. 5C, the operators W performing picking and packing are determined to be the operators W2, W1, respectively, from the candidate C12 determined as the task combination corresponding to the discrimination result in the task combination table T1. The trajectory data D0 is then updated with the positions associated with picking and packing, as the positions of the operators W2, W1, respectively. In the example illustrated in FIG. 6C, the operators W who perform packing and box preparation are determined to be the operators W1, W2, respectively, from the candidate C22 determined as the task combination corresponding to the discrimination result in the task combination table T2. The trajectory data D0 is then updated with the positions corresponding to packing and box preparation, as the positions of the operators W1, W2, respectively.

After discriminating the operators W and updating the trajectory data D0 (S17), the controller 50 ends the processing illustrated in this flowchart. The process then proceeds to step S7 in FIG. 7.

By the operator discrimination processing for the crossing state described above (S5), the controller 50 generates a task combination including a task that cannot be mapped to the operator W due to the crossing state of trajectories, as a candidate (S11), and determines the task combination of the discrimination result, from the candidates, referring to the task tendency information (S12 to S16). Accordingly, even when the trajectories become the crossing state, it is possible to discriminate the operators W the respective tasks, based on the determined task combination (S17), and therefore it is possible to estimate the operators W of the respective tasks.

In the example explained above, in step S11, tasks recognized in three frames are included in each task sequence in the task combination tables T1, T2. The task sequence is not limited to a sequence of tasks at each time, such as three frames, and may include three tasks of different kinds, for example. In this case, for example, the controller 50 generates the task combination tables T1, T2 referring to the past tasks that are associated with the trajectory data D0, until three kinds of tasks are obtained. Furthermore, without being limited to the three kinds, the controller 50 may generate a task sequence including a sequence of three tasks per a predetermined period. Furthermore, the number is not limited to three, and a task sequence including a sequence of two tasks may be generated.

In the generation of the task combination tables T1, T2 (S11), the controller 50 may narrow down the candidates of the operator W using the coordinate information in the trajectory data D0 and the moving distance per unit time. For example, the controller 50 may determine the operator W relevant to the crossing state in a task combination using the moving speed of the operator W that is based on the past positions, for example, in addition to the past positions of the operator W in the trajectory data D0.

3. Effects

As described above, the task analysis device 5 is an example of the image analysis device according to the present embodiment. The task analysis device 5 includes the device I/F 54 as an example of the input interface, the controller 50, and the storage 52. The device I/F 54 acquires image data indicating a captured image of a work site 6 in which a plurality of operators W performs a plurality of tasks (S1). Based on the image data, the controller 50 generates information associating the tasks and the operators W to positions in the trajectory data D0, the information being an example of the task history information indicating the tasks performed in the work site 6 by the respective operators W1 to W3 among the plurality of operators W (S5, S6). The storage 52 stores the task history information. The controller 50 successively recognizes the tasks and positions of the plurality of operators W, based on the image data at each time in the work site 6 (S2, S3, S7). The controller 50 detects the crossing state as an example of crossing caused between a plurality of trajectories, each trajectory including successive positions for each of the plurality of operators W (S4). When the crossing state is not detected (NO in S4), the controller 50 generates the task history information by associating tasks recognized at each time with the respective operators W1 to W3, based on the plurality of trajectories (S6). When the crossing state is detected (YES in S4), the controller 50 associates the recognized tasks with the respective operators W1 to W3, based on the recognized tasks and past task history information (S5).

By the task analysis device 5 described above, upon detection of the crossing state, in which it is difficult to associate tasks with the operators W1 to W3 based on the trajectories (S6) (YES in S4), the tasks are associated with the operators W1 to W3 based on the recognized tasks and the past task history information (S5). In this manner, when a plurality of tasks are performed by a plurality of operators W in a work site 6, it is possible to estimate the operators W performing the respective tasks.

In the present embodiment, the storage 52 stores the task tendency information indicating a tendency for the tasks performed in the work site 6. When the crossing state is detected (YES in S4), the controller 50 associates the recognized tasks with the respective operators W1 to W3, by referring to the task tendency information (S5). Therefore, even when it is difficult to map the tasks to the operators W1 to W3 by image recognition or the like of the positions of the operators W due to the crossing state of trajectories, it is possible to estimate the operator W corresponding to each task based on the task tendency information.

In the present embodiment, when the crossing state is detected (YES in S4), the controller 50 generates a plurality of task combinations, as an example of calculating a plurality of combinations of the recognized tasks and corresponding operators W to the plurality of crossing trajectories causing the crossing state (S11). The controller 50 determines one task combination in the plurality of task combinations based on the task tendency information (S16), and associates the recognized tasks with the respective operators W1 to W3, based on the determined one task combination (S17). In this manner, the task combination tables T1, T2 including a plurality of tasks combinations as the candidates C11 to C22 are generated (S11), and by narrowing down the candidates C11 to C22 based on the task tendency information, the task combination of the discrimination result is determined (S16). Therefore, the operators W the respective tasks can be discriminated, based on the determined task combination.

In the present embodiment, the task tendency information includes the task order information D2, as an example of information indicating an order of tasks in a combination of two or more tasks among a plurality of tasks. Based on the order, the controller 50 determines the one task combination (S16) by removing the task combination corresponding to the abnormal order, as an example of a predetermined order, from the plurality of task combinations (S12). Therefore, it is possible to determine the task combination not corresponding to the abnormal order in the task order information D2 as the discrimination result.

In the present embodiment, the task tendency information includes information indicating a standard task period set to the first task among the plurality of tasks. The controller 50 determines the one combination (S16), based on a period in which a task performed by an operator W is recognized as the first task, by removing a task combination in which the period is longer than the standard task period, from the plurality of task combinations (S13). In the example illustrated in FIGS. 6A to 6C, because packing (an example of the first task) performed by the operator W2 in the candidate C22 continues longer the standard task period, the task combination of the candidate C22 is removed from the task combination table T2 illustrated in FIG. 9B. Therefore, it is possible to determine the task combination including a specific task the task period of which conforms to the standard task period, as the discrimination result.

In the present embodiment, the controller 50 detects the crossing state based on the occlusion that is an example of overlapping of positions of the operators W1, W2 (an example of two or more operators) among the plurality of operators W in the image indicated by the acquired image data (S4). Therefore, it is possible to implement the crossing state detection that is based on the positions of the operators W in the image.

In the present embodiment, the storage 52 further stores the identification information D3 which identifies the respective operators W1 to W3. The controller 50 associates recognized positions with the respective operators W1 to W3 when the positions of the operators W in the work site 6 are recognized for the first time. In this manner, the controller 50 manages the operators W1 to W3 associating with the trajectory IDs assigned to the positions in the trajectory data D0. Accordingly, the trajectory data D0 is updated by associating the sequentially recognized positions of the operators W with the past positions of the operators W1 to W3 (S3), therefore it is possible to discriminate the operators W1 to W3 of the performed tasks at the recognized positions (S6).

The controller 50 generates the analysis chart 7 as an example of information indicating a ratio of each of the plurality of tasks over the analysis period (an example of the predetermined period), for each of the operators W1 to W3, based on the task history information in the analysis period. Therefore, the analysis chart 7 related to a plurality of operators W who perform a plurality of tasks in the work site 6 can be presented to the user 3 of the task analysis system 1, for example. The task analysis device 5 may further include an output I/F 55 and/or a monitor 4, as an example of a display that displays the generated information, such as the analysis chart 7.

The task analysis method is an example of the image analysis method in the present embodiment The method includes, by the controller 50 of a computer, acquiring image data indicating a captured image of a work site 6 in which a plurality of operators W performs a plurality of tasks (S1), and generating, based on the image data, task history information indicating the tasks performed by respective operators W1 to W3 among the plurality of operators W in the work site 6 (S2 to S7). In generating the task history information (S2 to S7), the controller 50 of the computer successively recognizes the tasks and positions of the plurality of operators W based on the image data at each time in the work site 6 (S2, S3, S7), and detects the crossing state as an example of crossing caused between a plurality of trajectories, each trajectory including successive positions for each of the plurality of operators W (S4). When the crossing state is not detected (NO in S4), the controller 50 generates the task history information by associating tasks recognized at each time with the respective operators. W1 to W3, based on the plurality of trajectories (S6). When the crossing state is detected (YES in S4), the controller associates recognized tasks with the respective operators W1 to W3, based on the recognized tasks and the past task history information (S5).

In the present embodiment, a program for causing a controller of a computer to execute the task analysis method as described above is provided. By the task analysis method according to the present embodiment, when a plurality of tasks are performed by a plurality of operators W, it is possible to estimate the operator W performing each one of the plurality of tasks.

Second Embodiment

Explained in the first embodiment is an example in which the task analysis device 5 performs the operator discrimination processing based on the information on the task period and the task order information D2. Explained in a second embodiment is an example in which a task analysis device 5 performs the operator discrimination processing also based on task plan information related to the work site 6.

The task analysis device 5 according to the present embodiment will be explained, by omitting the explanations of configurations and operations that are the same as those of the task analysis device 5 according to the first embodiment, as appropriate.

FIG. 10 is a table for explaining task plan information D4 in the task analysis device 5 according to the present embodiment. The task plan information D4 is an example of task plan information in the present embodiment, and includes a quota and an assignment for the operators W in the work site 6.

The task plan information D4 illustrated in FIG. 10 manages a "operator" in the work site 6, "handling quantity" indicating a quota of packing that is a main task, and an "assigned section" that is the section where the operator W mainly operates, in a manner associated with each other. The assigned section indicates a range of positions where the operator W does not perform any auxiliary task, such as box preparation, in the work site 6, for example. The auxiliary task is an example of the second task in the present embodiment. The handling quantity and the assigned section are set by the user 3 in advance, for example. In the task plan information D4 illustrated in FIG. 10, for example, the section Z1 is set as the assigned sections of the operators W1, W2, and the section Z2 is set as the section assigned to the operator W3.

An operation of the task analysis device 5 according to the present embodiment using the task plan information D4, such as that as described above, will now be explained with reference to FIGS. 11 to 13.

Figure 11:
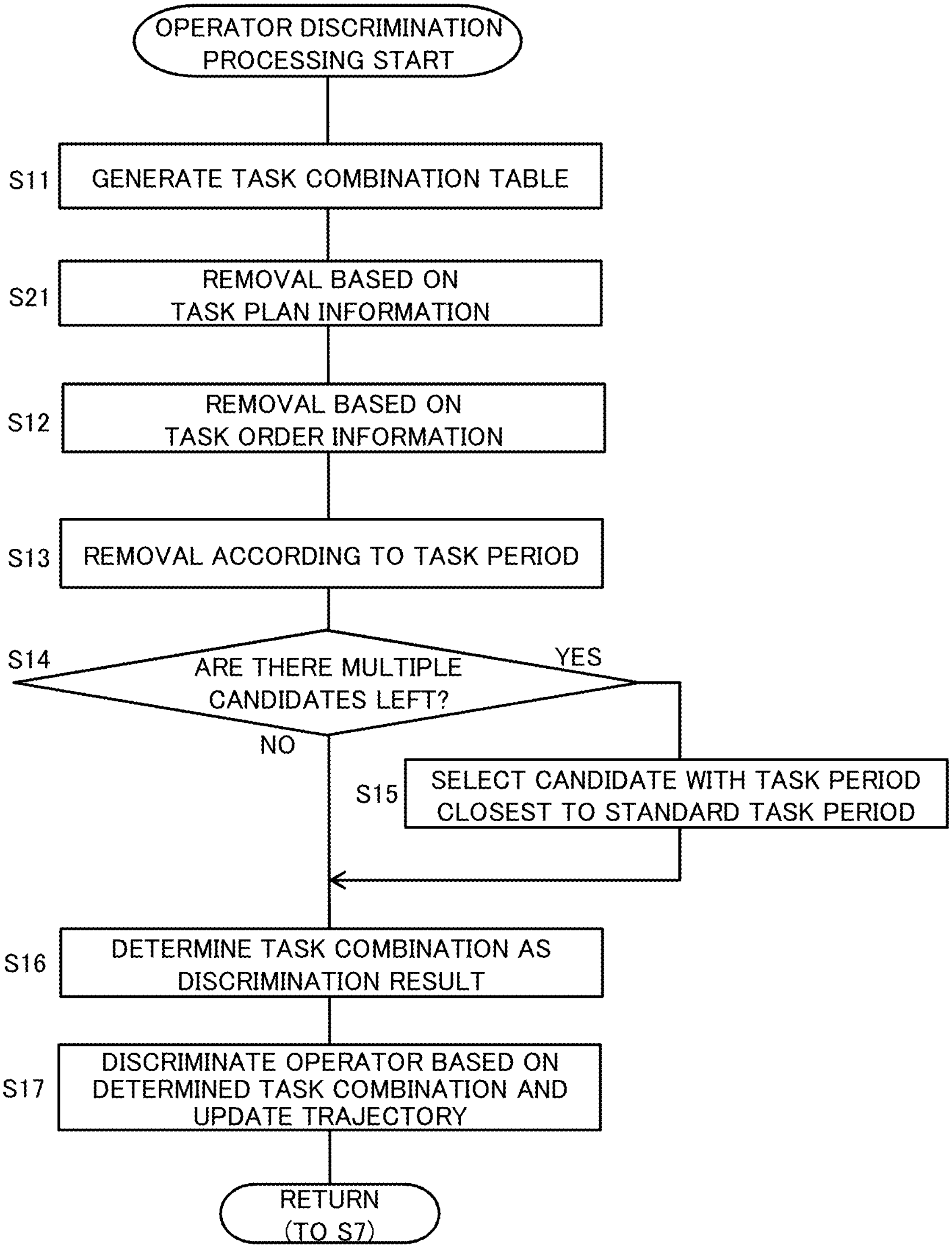
FIG. 11 is a flowchart illustrating operator discrimination processing according to the second embodiment.
Figure 12A:
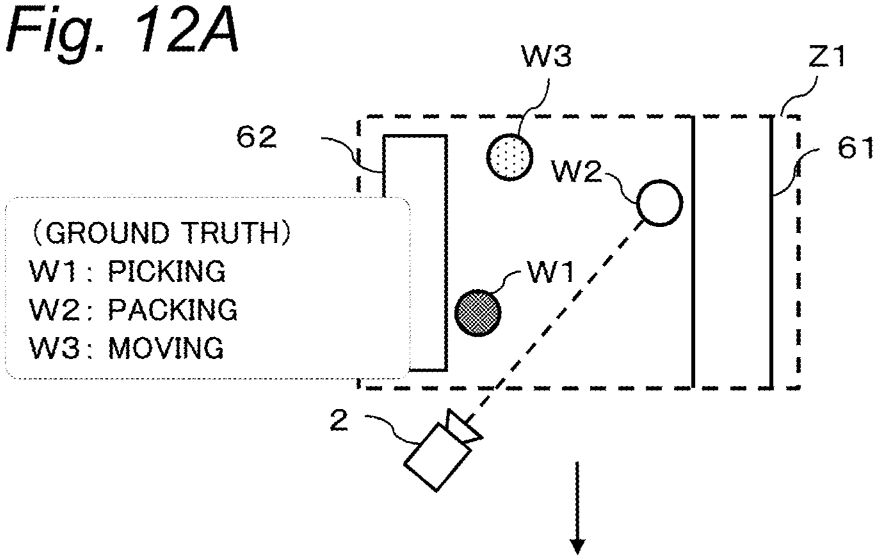
FIGS. 12A to 12C are views for explaining operator discrimination processing according to the second embodiment.
Figure 12B:
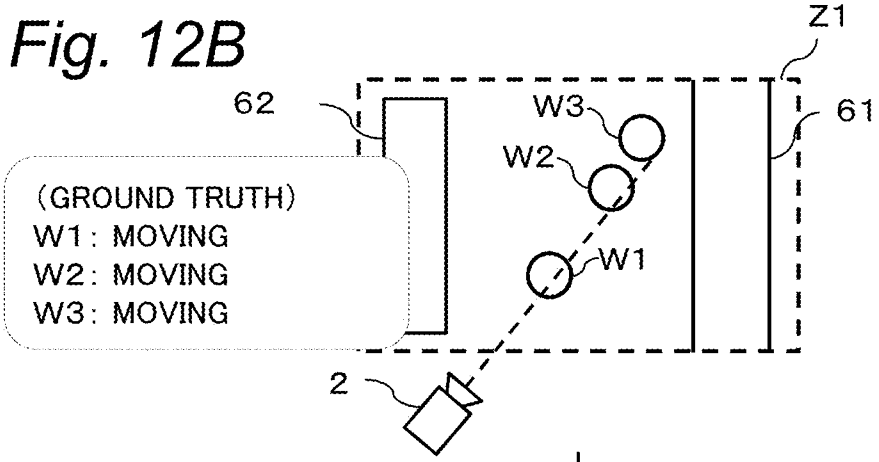
Figure 12C:
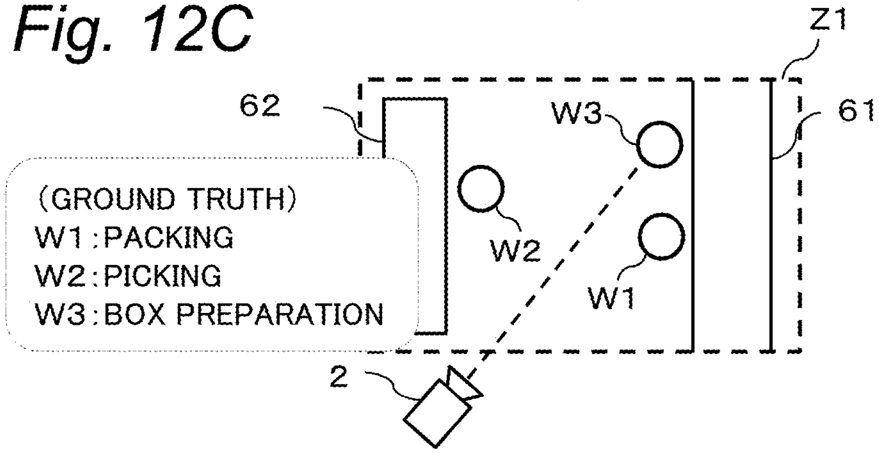

FIG. 11 is a flowchart illustrating the operator discrimination processing according to the present embodiment. In the task analysis device 5 according to the present embodiment, for example, the controller 50 removes the candidates from those in the task combination table (S21), based on the task plan information D4, in addition to the processing of steps S11 to S17 in the operator discrimination processing (S5) according to the first embodiment. FIGS. 12A to 12C are views for explaining the operator discrimination processing according to the present embodiment. FIG. 13 is a view for explaining task combinations in the operator discrimination processing according to the present embodiment.

Each of FIGS. 12A to 12C is a top view of the work site 6, in the same manner as to FIGS. 5A to 5C and 6A to 6C. FIG. 12 illustrates how the operator W3 from a different assigned section operates, in addition to the operators W1, W2 who are in the section Z1 of the work site 6.

FIG. 12A illustrates a scene where the operator W1 is "picking", the operator W2 is "packing", and the operator W3 who entered the section Z1 from the section Z2 is "moving". FIG. 12B illustrates a scene in which the operators W1 to W3 are "moving" from the scene illustrated in FIG. 12A. FIG. 12C illustrates a scene in which the moved operators W1, W3 are performing "packing" and "box preparation", respectively, and the operator W2 is performing "picking", from the scene illustrated in FIG. 12B. In the following, an example in which the trajectories of the operators W1 to W3 become the crossing state due to occlusion, is explained using the scene in FIG. 12B.

The flowchart illustrated in FIG. 11 starts when the crossing state is detected from the image data of a frame corresponding to the scene illustrated in FIG. 12B, for example (YES in S4 illustrated in FIG. 7).

The controller 50 recognizes the positions of the operators W and tasks in the frame of the next time corresponding to the scene illustrated in FIG. 12C, for example, in the same manner as in the example of the operator discrimination processing (S5) according to the first embodiment in FIG. 5, and generates the task combination table (S11). FIG. 13 illustrates the task combination table T3 generated in step S11, correspondingly to the examples illustrated in FIGS. 12A to 12C.

Next, the controller 50 removes candidates from the task combination table T3, based on the task plan information D4 (S21). The controller 50 removes a candidate in which each of the operators in their assigned sections performs box preparation that is the auxiliary task as the latest performed task, from the task combination table T3, referring to the assigned section in the task plan information D4, for example. This rule for the exclusion is set in advance, based on the task plan information D4, considering that the operator W is most likely to perform packing that is the main task or picking related to the main task in the assigned section, for example. Because the operator W1 is assigned with the section Z1 as the assigned section in the task plan information D4 illustrated in FIG. 10, the candidates C35, C36 in which the latest performed task of the operator W1 is the box preparation are removed from the task combination table T3. Similarly to the example for the operator W1, for the operator W2, the candidates C32, C34 are removed from the task combination table T3.

Thereafter, the controller 50 removes candidates from the task combination table T3, based on the task order information D2 and the task period (S12 to S13). In the example illustrated in FIGS. 12A to 12C, because the task combination for the operator W2 in the candidates C33 corresponds to the abnormal order in the task order information D2, the candidate C33 is removed from the task combination table T3 (S12). The controller 50 determines the candidate C31 remaining without being removed from the task combination table T3 as the task combination of the discrimination result (S16).

As described above, in the present embodiment, the task tendency information includes the task plan information D4, as an example of information which associates the respective operators W1 to W3 with an assigned section (an example of an assigned range) indicating a range of positions where the respective operators W1 to W3 do not perform the auxiliary task that is an example of the second task among the plurality of tasks in the work site. When a position of an operator W is included in the assigned section assigned to the operator W, the controller 50 removes the task combination in which the task performed by the operator W is the auxiliary task, from the plurality of tasks combinations (S21), to determine the one task combination (S16). Therefore, it is possible to determine the task combination in which each of the operators W performs the main task in the assigned section as the discrimination result.

The exclusion based on the task plan information D4 (S21) is not limited to that based on the assigned section, and information regarding various task plans may be used. For example, the exclusion may be performed using information related to the number of handling quantity. For example, when the operator W already performed packing the number of times corresponding to the predetermined handling quantity, combinations including packing for subsequent time may be removed, considering that the operator W is not likely to perform packing at the subsequent time.

OTHER EMBODIMENTS

The first and the second embodiments are described above, as some examples of the technology disclosed in the present application. However, the technology according to the present disclosure is not limited thereto, and may also be applied to embodiments including changes, replacements, additions, omissions, and the like made as appropriate. In addition, it is also possible to combine the elements described in the embodiments to form a new embodiment. Other embodiments will now be explained as some examples.

In each of the embodiments described above, the task order information D2 in which the abnormal order is mapped to the section in the work site 6 is explained. In this embodiment, the task order information D2 may include a standard order indicating an order in which an operator W perform different tasks, correspondingly to each of the sections in the work site 6, for example. In this case, in the exclusion processing (S12) performed based on the task order information in the operator discrimination processing (FIG. 8, FIG. 11), candidates not conforming to the standard order may be removed from the task combination tables T1 to T3, for example.

Explained in each of the embodiments above is an example in which the image recognizer 51 outputs the recognition result of the position of a person, as a person without distinguishing the operators W1 to W3 from one another. The image recognizer 51 according to this embodiment may recognize the positions of the operators W1 to W3 by the operators W1 to W3 from one another, using face recognition technology, for example. Also in this case, the operation of the task analysis device 5 according to this embodiment can be applied when a task can be recognized, the task being performed by each operator W whose face is not illustrated in the captured image of the camera 2, for example.

Explained in each of the embodiments above is an example in which the operator W at every position recognized by the image recognizer 51 is subjected to the analysis. The task analysis device 5 according to this embodiment, however, may exclude the positions of some operators who are not to be subjected to the analysis, from the task-related processing (S4 to S5, S8). For example, in the work site 6, operators at positions outside the task areas A1, A2 and an area therebetween, such as the area for refilling, may be excluded. In addition, for example, an operator who performs process management or monitoring in the work site 6 may be excluded from the processing, based on a tendency that the trajectories of such operators pass through the area between the task areas A1, A2 for a long time period.

Explained in each of the embodiments above is the task analysis device 5 that removes candidates based on the task period, with reference to preset task period information (S13). In the task analysis device 5 according to this embodiment, for example, the period of the picking task may be set, for each of the operators, based on the period for which the respective operators stayed in the task area A2 on the side of the shelves 62 in the past.

Explained in each of the embodiments above is an example in which the operator discrimination processing is performed using information, such as a task period, corresponding to each task. In the operator discrimination processing, without limitation to the task period of each task, the task analysis device 5 according to the present embodiment may execute the operator discrimination processing using information such as a period in which the operator is presumably performing a task outside the angle of view of the camera 2, or a period in which the operator is taking a break.

Explained above in the embodiments is an example in which the task analysis system 1 is applied to the work site 6 such as a logistics warehouse. In the present embodiment, the work site where the task analysis system 1 and the task analysis device 5 are used, that is, a site is not particularly limited to the work site 6 described above, and may be various types of work sites such as a factory or a store floor. In addition, the task determined by the task analysis system 1 is not limited to the example of tasks such as packing described above, and may be various tasks performed in various sites. In addition, the operator to be analyzed by the task analysis system 1 is not limited to a person such as the operator W, and may be any moving object capable of performing various types of task. For example, the moving object may be a robot, or may be various manned or unmanned vehicles.

As described above, the embodiments are described as examples of the technology according to the present disclosure. The accompanying drawings and the detailed description are provided for this purpose.

Accordingly, the components described in the accompanying drawings and the detailed description may include not only the components essential for solving the problems, but also components that are not essential for solving the problems, for the purpose of explaining the examples of the above technology. Therefore, it should not be immediately recognized that these non-essential components are essential based on the fact that these non-essential components are described in the accompanying drawings and the detailed description.

The present disclosure is applicable to data analysis for analyzing tasks performed by operators in various environments such as a logistics site or a factory.

What is claimed is:

1. An image analysis method, wherein a controller of a computer is configured to execute:

acquiring image data indicating a captured image of a site in which a plurality of operators performs a plurality of tasks; and generating, based on the image data, task history information indicating the tasks performed in the site by respective operators among the plurality of operators, wherein the controller of the computer is configured to execute, in generating the task history information:

successively recognizing the tasks and positions of the plurality of operators, based on the image data at each time in the site;

detecting crossing caused between a plurality of trajectories, each trajectory including successive positions for each of the plurality of operators;

generating the task history information by associating tasks recognized at each time with the respective operators, based on the plurality of trajectories, when the crossing is not detected; and associating the recognized tasks with the respective operators, based on the recognized tasks and past task history information, when the crossing is detected, wherein the controller is configured to associate the recognized tasks with the respective operators by referring to task tendency information when the crossing is detected, the task tendency information indicating a tendency for the tasks performed in the site.

2. A tangible non-transitory computer-readable medium storing a program for causing a controller of a computer to execute the image analysis method according to claim 1.

3. An image analysis device comprising:

an input interface configured to acquire image data indicating a captured image of a site in which a plurality of operators performs a plurality of tasks;

a controller configured to generate, based on the image data, task history information indicating the tasks performed in the site by respective operators among the plurality of operators; and a storage configured to store the task history information, wherein the controller is configured to:

successively recognize the tasks and positions of the plurality of operators, based on the image data at each time in the site; and detect crossing caused between a plurality of trajectories, each trajectory including successive positions for each of the plurality of operators, wherein the controller is configured to:

generate the task history information by associating tasks recognized at each time with the respective operators, based on the plurality of trajectories, when the crossing is not detected; and associate the recognized tasks with the respective operators, based on the recognized tasks and past task history information, when the crossing is detected, wherein the storage is configured to store task tendency information indicating a tendency for the tasks performed in the site, and wherein the controller is configured to associate the recognized tasks with the respective operators by referring to the task tendency information when the crossing is detected.

4. The image analysis device according to claim 3, wherein the controller is configured to associate the recognized tasks with the respective operators by selecting a combination from candidate combinations of the recognized tasks and the recognized operators of which positions are recognized for the plurality of trajectories causing the crossing, based on the recognized tasks and past task history information generated on performed tasks by the respective operators, when the crossing is detected.

5. The image analysis device according to claim 3, wherein the controller is configured to, when the crossing is detected, calculate a plurality of combinations of the recognized tasks and corresponding operators to the plurality of trajectories causing the crossing;

determine one combination in the plurality of combinations based on the task tendency information; and associate the recognized tasks with the respective operators based on the determined one combination.

6. The image analysis device according to claim 5, wherein the task tendency information includes information indicating an order of tasks in a combination of two or more tasks among the plurality of tasks, and the controller is configured to determine the one combination, based on the order, by removing a combination corresponding to a predetermined order from the plurality of combinations.

7. The image analysis device according to claim 5, wherein the task tendency information includes information indicating a standard task period set to a first task among the plurality of tasks, and the controller is configured to determine the one combination, based on a period in which a task performed by an operator is recognized as the first task, by removing a combination in which the period is longer than the standard task period from the plurality of combinations.

8. The image analysis device according to claim 5, wherein the task tendency information includes information which associates the respective operators with an assigned range indicating a range of positions where the respective operators do not perform a second task among the plurality of tasks in the site, and the controller is configured to determine the one combination by removing, when a position of an operator is included in the assigned range of the operator, a combination that includes the second task as a task performed by the operator from the plurality of combinations.

9. The image analysis device according to claim 3, wherein the controller is configured to detect the crossing based on overlapping of positions of two or more operators among the plurality of operators in the image indicated by the acquired image data.

10. The image analysis device according to claim 3, wherein the storage is further configured to store identification information which identifies the respective operators, and the controller is configured to associate recognized positions with the respective operators when the positions of the operators in the site are recognized for first time.

11. The image analysis device according to claim 1, wherein the controller is configured to generate information indicating a ratio of the plurality of tasks performed over a predetermined period, for each of the operators, based on the task history information in the predetermined period.

* * * * *